(12) United States Patent
Beaurpere et al.

(10) Patent No.: US 9,740,685 B2
(45) Date of Patent: Aug. 22, 2017

(54) GENERATION OF NATURAL LANGUAGE PROCESSING MODEL FOR AN INFORMATION DOMAIN

(71) Applicant: International Business Machines Corporation, Armonk, NY (US)

(72) Inventors: David Beaurpere, Dublin (IE); David Kearns, Dublin (IE); Daniel McCloskey, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 707 days.

(21) Appl. No.: 13/712,460

(22) Filed: Dec. 12, 2012

(65) Prior Publication Data

US 2013/0151238 A1  Jun. 13, 2013

(30) Foreign Application Priority Data

Dec. 12, 2011 (EP) .................................. 11306635

(51) Int. Cl.
*G06F 17/20* (2006.01)
*G06F 17/21* (2006.01)
(Continued)

(52) U.S. Cl.
CPC ............ *G06F 17/28* (2013.01); *G06F 17/241* (2013.01); *G06F 17/2735* (2013.01); *G06F 17/218* (2013.01)

(58) Field of Classification Search
None
See application file for complete search history.

(56) References Cited

U.S. PATENT DOCUMENTS

| 7,027,974 B1 | 4/2006 | Busch et al. |
| 7,610,188 B2 | 10/2009 | Weise |

(Continued)

FOREIGN PATENT DOCUMENTS

| CN | 1949211 A | 4/2007 |
| CN | 101201818 A | 6/2008 |

(Continued)

OTHER PUBLICATIONS

Bai, Shuanhu et al., "Language Models Learning for Domain-Specific Natural Language User Interaction", Proceedings of the 2009 IEEE International Conference on Robotics and Biomimetics Dec. 19-23, 2009, Guilin China, pp. 2480-2485, http://ieeexplore.ieee.org/xpl/freeabs_all.jsp?arnumber=5420442.

(Continued)

*Primary Examiner* — Richemond Dorvil
*Assistant Examiner* — Thuykhanh Le
(74) *Attorney, Agent, or Firm* — Cantor Colburn LLP; Robert Bunker (57) ABSTRACT

Embodiments relate to a method, apparatus and program product and for generating a natural language processing model for an information domain. The method derives a skeleton of a natural language lexicon from a source model and uses it to form a dictionary. It also applies a set of syntactical rules defining concepts and relationships to the dictionary and expands the skeleton of the natural language lexicon based on a plurality of reference documents from the information domain. Using the expanded skeleton of the natural language lexicon, it also provides a natural language processing model for the information domain.

19 Claims, 6 Drawing Sheets

(51) Int. Cl.
*G06F 17/27* (2006.01)
*G06F 17/28* (2006.01)
*G06F 17/24* (2006.01)

(56) References Cited

U.S. PATENT DOCUMENTS

| | | | |
|---|---|---|---|
| 7,676,485 B2 | 3/2010 | Elfayoumy et al. | |
| 7,739,104 B2 | 6/2010 | Berkan et al. | |
| 2002/0013694 A1* | 1/2002 | Murata | G06F 17/271 704/9 |
| 2002/0046019 A1* | 4/2002 | Verhagen | G06F 17/2785 704/9 |
| 2004/0078193 A1* | 4/2004 | Masuichi | G06F 17/2881 704/9 |
| 2004/0139095 A1* | 7/2004 | Trastour | H04L 69/24 |
| 2004/0243394 A1* | 12/2004 | Kitamura | G06F 17/271 704/9 |
| 2005/0055200 A1* | 3/2005 | Park | G06F 17/2755 704/4 |
| 2005/0197995 A1* | 9/2005 | Badt | H04L 67/24 |
| 2006/0053174 A1 | 3/2006 | Gardner et al. | |
| 2006/0074632 A1 | 4/2006 | Nanavati et al. | |
| 2009/0006078 A1 | 1/2009 | Selegey et al. | |
| 2009/0076795 A1* | 3/2009 | Bangalore | G06F 17/2785 704/9 |
| 2009/0119095 A1* | 5/2009 | Beggelman | G06F 17/2785 704/9 |
| 2009/0204386 A1* | 8/2009 | Seligman | G06F 17/2755 704/2 |
| 2010/0228538 A1* | 9/2010 | Yamada | G06F 17/27 704/9 |
| 2010/0281025 A1* | 11/2010 | Tsatsou | G06Q 30/02 707/733 |
| 2010/0312545 A1* | 12/2010 | Sites | G06F 17/275 704/8 |
| 2011/0066566 A1* | 3/2011 | Adams | G06Q 10/067 705/348 |
| 2011/0271176 A1* | 11/2011 | Menday | G06F 17/30734 715/234 |
| 2011/0281025 A1* | 11/2011 | Arai | B82Y 10/00 427/130 |
| 2011/0301941 A1* | 12/2011 | De Vocht | G06F 17/2715 704/9 |
| 2011/0320186 A1* | 12/2011 | Butters | G06F 17/30672 704/9 |
| 2012/0065960 A1* | 3/2012 | Iwama | G06F 17/2705 704/9 |
| 2012/0143954 A1* | 6/2012 | Vincent | G06F 9/546 709/204 |

FOREIGN PATENT DOCUMENTS

| | | |
|---|---|---|
| CN | 101520775 A | 9/2009 |
| CN | 101529418 A | 9/2009 |
| CN | 101833561 A | 9/2010 |
| JP | 7093372 A | 4/1995 |

OTHER PUBLICATIONS

Brants, Thorsten et al., "Topic-Based Document Segmentation with Probabilistic Latent Semantic Analysis", CIKM '02 Nov. 4-9, 2002, McLean, Virginia, USA, 8 pages.

Cimiano, P., "LexOnto: A Model for Ontology for Lexicons for Ontology-based NLP", 2007, Proc. of OntoLex, 12 pages, http://citeseerx.ist.psu.edu/viewdoc/download?doi=10.1.1.73.1056&rep=rep1&type=pdf.

Gruber, Thomas R., "A Translation Approach to Portable Ontology Specifications", Knowledge Acquisition 1993, Knowledge Systems Laboratory, pp. 1-24.

Nagai, Masahiko et al., "Semantic Network Dictionary for Ontological Information with Wiki", Semantic Network Dictionary for Ontological Information with Wiki I Earthszine, posted Aug. 6, 2010, pp. 1-9, http://www.earthzine.org/2010/08/06/semantic-network-dictionary-for-ontological-information-with-wiki/.

Soderland, Stephen G., "Learning Text Analysis Rules for Domain-Specific Natural Language Processing", submitted to the Graduate School of the Univ. of Massachusetts Amherst, Feb. 1997, 211 pages.

Simonov, Mikhail et al., "Ontology-driven Natural Language access to Legacy and Web services in the Insurance Domain", Business Information Systems BIS-2004, pp. 1-10, http://www.google.com/url?sa=t&rct=j&g=&esrc=s&source=web&cd=2&ved=0ahUKEwjojeC9ueDTAhUH0YMKHWMmAzgQFggkMAE&url=http%3A%2F%2Fwww.loa.istc.cnr.it%2Fold%2FPapers%2FBIS_2004.pdf&usg=AFQjCNEkktn39RKTrRQwlz7Zm_Y3EhoxQ.

Vargas-Vera, Maria et al., "MnM: Ontology Driven Semi-Automatic and Automatic Support for Semantic Markup", 2002, 14 pages, http://citeseerx.ist.psu.edu/viewdoc/download?doi=10.1.1.20.2437&rep=rep1&type=pdf.

Verladi, Paola, et al., "Using Text Processing Techniques to Automatically enrich a Domain Ontology", Proceedings of the international conference on Formal Ontology in Information Systems—vol. 2001, 10 pages.

Witte, Rene et al., "Ontology Design for Biomedical Text Mining", Revolutionizing Knowledge Discovery in the Life Sciences, Chapter 13, 2006, pp. 1-33, http://www.google.ie/url?sa=t&source=web&cd=1&ved=0CBgQFjAA&url=http%3A%2F%2Frene-witte.net%2Fsystem%2Ffiles%2Fontology_design_preprint.pdf&rct=j&q=%20ontology%20derived%20text%20analysis%20model&ei=inviTP6_EY3lswabkYDuCw&usg=AFQJCNHpriGpemSEQ3e81jDUNFAOwBEmyg&sig2=fMRw50N67gMFgzjhnw1-Bg&cad=rja.

Basel Committee on Banking Supervision, "International framework for liquidity risk measurement, standards and monitoring" Bank for International Settlements, Dec. 2009, 44 pages

International Search Report and Written Opinion for PCTIB2012056737 filing date Nov. 26, 2012, with a mailing date of Apr. 25, 2013, 8 pages.

* cited by examiner

GENERATION OF NATURAL LANGUAGE PROCESSING MODEL FOR AN INFORMATION DOMAIN

PRIORITY

The present application claims priority to European application number 11306635.1 filed Dec. 12, 2011 and all benefits accruing therefrom under U.S.C. §119, the contents of which is incorporated herein in its entirety.

BACKGROUND

This disclosure relates generally to the field of generating natural language processing models and in particular to generating a natural language processing model for an information domain.

Modern business analytics and processes are heavily dependent on information flowing through and around the business. Core business process information includes both transactional data and textual data from sources such as emails, report documents, presentations, and instant messaging. This information can be said to be the information flowing "through" the business and originates from within an authenticated community.

The relative importance of the textual component of this information has been increasing steadily for many years and is now recognized as a very important component. The textual component of the information is largely unharnessed at this time because of the difficulties in creating natural language processing (NLP) models for understanding this unstructured content.

The impact that advanced NLP models can have on a business is such that it is one of the fastest growing requirements in the information technology industry at present.

SUMMARY

Embodiments include a method, system, and computer program product for capturing thread specific state timing information for generating a natural language processing model for an information domain. The method derives a skeleton of a natural language lexicon from a source model and uses it to form a dictionary. It also applies a set of syntactical rules defining concepts and relationships to the dictionary and expands the skeleton of the natural language lexicon based on a plurality of reference documents from the information domain. Using the expanded skeleton of the natural language lexicon, it also provides a natural language processing model for the information domain.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the embodiment of the invention may be practiced without these specific details. In other instances, well-known methods, procedures, and components have not been described in detail so as not to obscure embodiments of the invention.

A method and a system are described for generating and maturing a natural language processing model targeted at an intended information domain. The method takes advantage of the existence in many cases of a domain or industry model, in essence an ontology of the business domain itself.

Natural language processing (NLP) model is a term used to describe an abstracted set of inputs to a text analysis engine so that it might extract concepts (named entities, like "person" references, "location" references, etc.) and relationships between those concepts (e.g. "lives at"). With these "facts", the text can be exposed for programmatic use and process automation. Examples of facts in this case would be "John McGrath lives at 123 Main St., Dublin" or "Michael provided 321 Main St. as his home address."

As mentioned, the impact that advanced NLP models can have on a business is substantial but due to the complexity of natural language, creating NLP models are not easy. Such a model is very dependent on the "domain" of input which is to be processed. There is no one-size-fits-all model, even for something like identifying "person", there will be varying degrees of success (defined by accuracy or precision/recall) in different sources of text. For example, "person" mentioned in medical records will differ greatly from "person" mentioned in academic citations. Further, in the case of medical records a sub-classification of "person" is very important to understand so that the NLP system would assign the correct semantic sub-class to any specific person reference, for example, the difference between patient and surgeon, personal physician, etc.

Domain specific NLP models are costly to develop and maintain. There are two known approaches to developing such NLP models: 1) manual ground up creation of word lists and contextual rules, and 2) machine learning based approaches which require an annotated corpus as input upon which machine learning algorithms run to "learn" the features which indicate the assignment of a semantic class to a given span of text.

Both known methods are very time consuming, the former has the advantage of being explicit and manually tunable where the latter is a black box but does offer a lower bar of entry in that only knowledge of the domain itself is required for the annotating task whereas in the former some knowledge of the underlying matching techniques is also needed.

A cost effective solution is provided to generate and mature domain specific natural language processing models from domain or industry models (for example, such as those available and actively developed by IBM's® Industry Models Group, IBM® is a trade mark of International Business Machines Corporation) or other forms of ontology. This starting model or ontology is referred to as the source model. This allows for the rapid creation, deployment and maintenance of a natural language processing model. The natural language processing model may then be used to analyze free text documentation within solutions for that domain.

The described method and system leverage the structure and information of the domain model to generate an initial NLP model and to allow augmentation of the sparse labeling of nodes in the initial NLP model (by definition the nodes in the initial model may be labeled with a single term as a recommended best practice preferred use term) via keyword and verb clustering and scoring techniques.

The interactions between entities in the model itself enable the gathering of textual representations of the concepts contained/referred to therein. A number of known and simple empirical techniques may be used to trim and extrapolate the dictionaries and rules. However, without using the ambient nature of the model, i.e. the collection of outlinks (relation or predicate) and target node types and their specifications in turn, there would be a lot of noise in the model.

Figure 1:
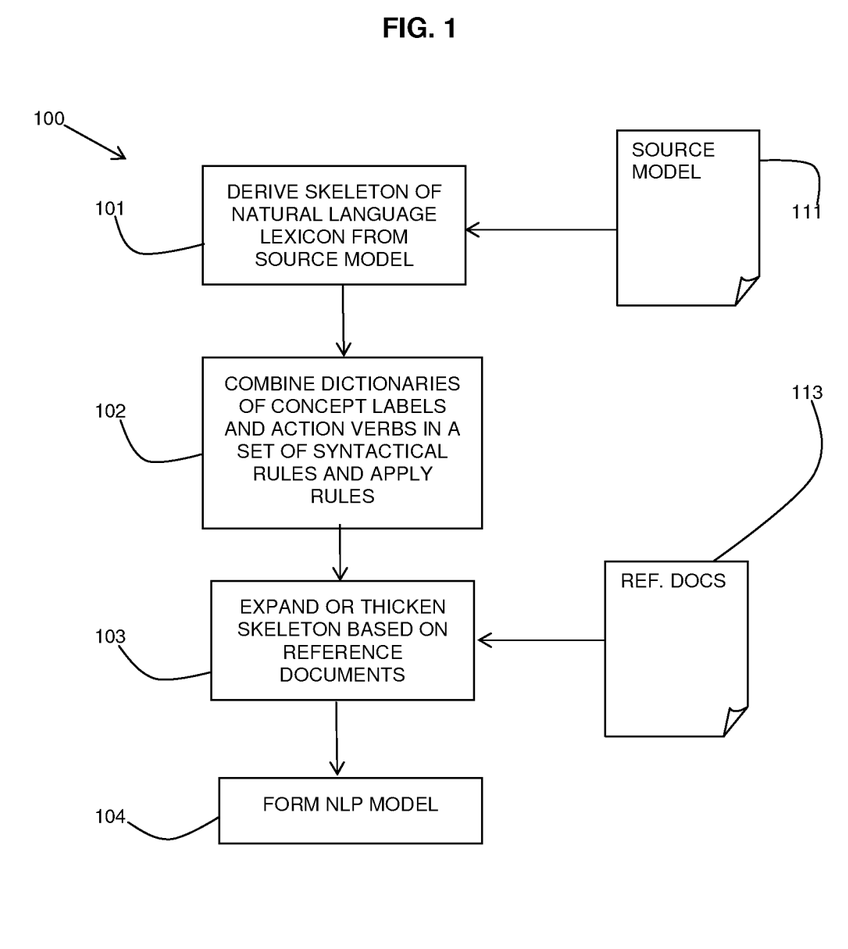
FIG. 1 is a flow diagram of an embodiment of a method in accordance with an embodiment of the present invention.

Referring to FIG. 1, a flow diagram 100 shows an embodiment of the described method.

A skeleton of a natural language lexicon targeted at an information domain may be derived 101 from a source model 111. The source model 111 may be any form of ontology, such as an industry or domain model or other form of ontology in the specific information domain (for example, the ontology may be a database schema). By their nature these source models provide the necessary data to derive the skeletons of natural language lexicons targeted at their intended information domain (banking, insurance, medical, etc.). The method may use more than one source model including external and publicly available models and data e.g. Linked Open Data, WordNet etc.

The skeleton natural language lexicon may be built directly from the source conceptual model optionally including synonyms from the business glossaries. Alternatively, the skeleton may be built from Linked Open Data (a project of W3C Sematic Web Education and Outreach) where the ontology classes in the source model may be matched against a class described in the Linked Open Data cloud. This may apply if the initial skeleton has no instance data (only type description) in which case it is possible to leverage Linked Open Data to populate the skeleton initially.

This results in sparse dictionaries of concept labels and action verbs, which are combined and applied 102 in a simple set of seed syntactical rules taking subject-predicate-object and varying order for coverage or by language rules. For example, some languages might have a predominance of constructions where the order of "John saw Mary" (subject-predicate-object) is more naturally expressed as "saw John Mary".

However, because the source models used to derive the initial skeleton purposefully describe the involved concepts and relationships via a limited set of preferred terms or labels (usually one), the resulting lexicon(s) needs to be expanded or "thickened". Concepts and relationships are referred to separately in the following description; however, a relationship may be considered to be a special type of concept.

Once such a skeleton is in place, it needs to be expanded or thickened 103 with synonym words, verbs and expressions via key word clustering and other standard techniques. The thickening 103 is carried out based on a set of reference documents 113 taken from the information domain (for example, emails, policies, guidelines, documents, reports, etc.). The thickening 103 includes derivation of concept and relationship label terms from preferred terms in the skeleton and generation of syntactic rules from the set of seed syntactic rules.

The thickened skeleton forms 104 the basis of the NLP model used to process all unstructured information in the business and semantically classify all mentions of concepts in domain documents so they can be used for text analysis.

Across any mid to large size organization there are many applications operating in the same business domain (e.g. multiple payment engines, customer-on-boarding applications). An organization may have an ever increasing amount of products and services which grows the amount of data within the organization at an exponential rate. To tackle this problem, common architectures and a common business language is needed to increase operational efficiency and time-to-market.

A common business language is needed to address these issues when doing any of the following: cross line of business processing; application rationalization; project requirements gathering; business to IT; regulatory compliance; etc. There are multiple synonyms across lines of businesses and it is very difficult to rationalize them, this issue is exacerbated when new regulatory requirements need to be deciphered and catered for.

Industry models include specific resources to answer this need of a common structured business language and therefore provide an opportunity for cost effective generation of domain specific NLP models.

Each industry model may include several model layers of the targeted domain knowledge (e.g. banking, insurance, healthcare, . . . ). In particular, they may include: business glossaries for free text definitions of terms in the industry domain, including synonyms, acronyms, phrases, etc.; and conceptual models for high level concept/construct definitions and their inherent relationship structures.

Figure 2:
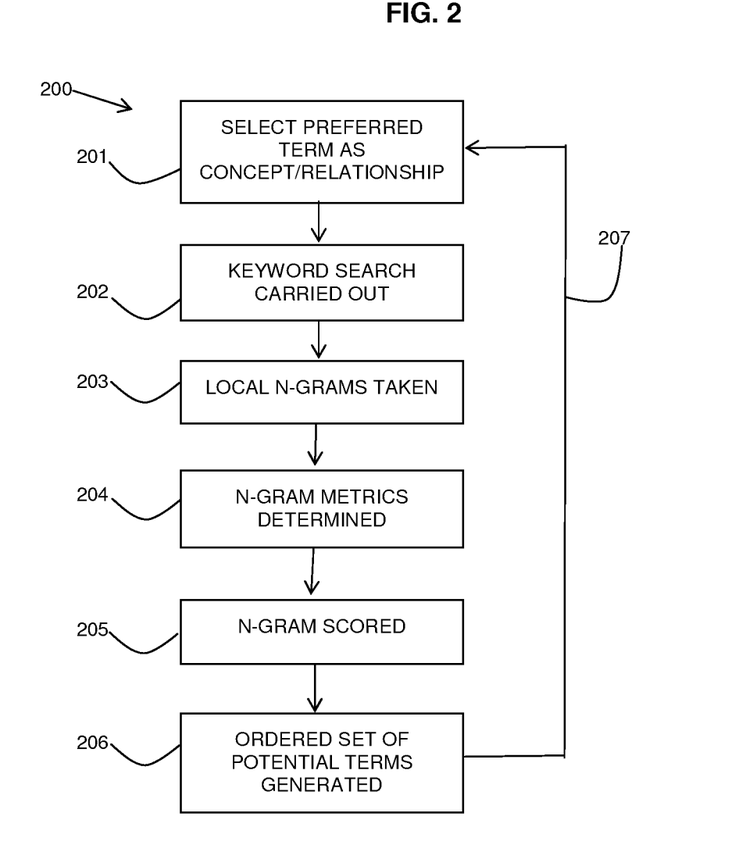
FIG. 2 is a flow diagram of further details of the method of FIG. 1 in accordance with an embodiment of the present invention.

Referring to FIG. 2, a flow diagram 200 shows an embodiment with further processing detail of the described method. An initial preferred term is selected 201 as a term of a starting concept or relationship. The skeleton natural language lexicon may be used to initially identify the passages in the text which will yield further terminology and syntax to enable a thickening process. The preferred term may be a keyword match from the skeleton natural language lexicon.

The preferred term may be used as keyword search 202 in a set of reference documents taken from the business domain (e.g. emails, formal policies, guidelines, reports, etc.). The keyword search may be a case insensitive keyword search with the aim of achieving a good recall of passages in documents which enables the gathering of a comprehensive vocabulary and syntax. Alternatively, if there is value in performance terms, a case sensitive keyword search may be used. For example, a case sensitive keyword search may be used in some domains or documents where there may be significant overlap and a case insensitive search would generate too much noise.

The local n-grams and/or phrases may be taken 203, meaning all overlapping sets of words where the number of words is "n" in the vicinity of the preferred term. In the case of concepts, the noun phrases containing the preferred term may be taken. Similarly, the relevant verb phrases may be taken for relationships.

An n-gram metric may be determined 204. In the simplest embodiment, the n-gram frequency is counted, and n-grams scored 205 with a text proximity score, which may naturally include frequency but would not be limited to this specific metric.

There are many possible measures which could potentially influence the ranking of potential terms. These may include known techniques such as topic decomposition, latent semantic analysis, etc. and also may include application of synonyms and general resources such as WordNet as long as domain specificity is maintained.

Examples of possible metrics include, but are not limited to, the following: The number of tokens to the preferred term (displacement); frequency calculation may apply tf/idf style normalization for the document corpus; although not required for good results it may provide some improvement in certain cases; term inclusion may need also to take co-reference resolution into account e.g. "they"=IBM in context of sentence describing an action that the important customer are taking . . . perhaps="they will close their account if the interest is not credited by . . . ".

The application of dedicated NLP models which would identify patterns which are likely to indicate definition. An example rule may be: "IBM are an important customer" would give cause to include the general pattern of an unknown (meaning out of normal language vocabulary) or all UPPERCASE ("IBM") or Titlecase or CaMeLCase token followed by any inflection of the verb "to be" ("are") followed by optional determiner ("an") and adjective ("important") before the reference to the preferred term for the concept ("customer"). Other examples may include: favoritism for unknown or out-of-vocabulary terms (where out-of-vocabulary here primarily refers to not part of the language in question e.g. English) and exclusion of so called "stopwords" e.g. "if", "a", "then", (Stopwords lists would have to be specified separately, potentially for each node but likely for concepts vs. relationships.)

Similarly, for verb relationships, a verb relationship may be considered as a special kind of concept and may be represented as such in terms of the node and link structure of the ontology or model.

Further to what is contained in the description for concepts, verb relationship concepts may have the additional option of linguistic verbal analysis applied. Verbs may be classified into groups which have different value frames. For example, the kinds of tenses a verb takes and how they are arranged when a compound verb is used, which formats are optional, the "direction" of the verb, e.g. "Paul kicked the dog" . . . kicked takes a subject and object in this case the direction is from Paul to the dog, i.e. Paul is the subject and the dog is the object, so concept {Subject:=(Person, instance=Paul)} is linked via a verbal relation "kicked" to concept {Object:=(Animal, instance=the dog)}.

The described term based n-gram intersection based on ontology/domain model largely mitigates the need for such detailed verb knowledge but where it exists or is available via a processor such as a linguistic deep parser, the described approach may make use of it. Often such approaches do not behave well in texts with heavy use of domain specific language so combining the described model based intersection approach on concept based n-grams where concept can be taken in its more general form (i.e. includes the verb relationship concepts too) may have a positive effect on overall results and remove the need for complex base linguistic processing such as deep parsing which in such domain specific cases would be error prone.

An ordered set of potential terms may be generated 206 for the concept node or relationship in the source model but it will still be quite noisy.

Having done this for a starting concept or relationship, the method may iterate 207 to the next concept or relationship node. In one embodiment, the iteration may move out the relationship links in the model and repeat for each of those, resulting in a set of terms for each concept and relation and neighboring concepts. Alternatively, the process may jump to neighboring concept nodes before relationship nodes, for example, due to the relative simplicity of more atomic noun phrases.

As the method iterates 207 outward from the starting concept node or relationship node in the source model, the set of terms of previous nodes may be refined by increasing scores (additive or other weighted function) based on intersection with the current node.

Any combination of concept or relationship may be used for iteration 207, including event driven changes or switching of approach. Alternative strategies may be used including coordination between strategies driven by heuristics.

For example, the rate of change in frequencies may be monitored for possible synonyms as the algorithm is run may influence which approach is next used and this may vary dynamically depending on monitoring of the metrics. If the results are not being found fast enough, alternative strategies may be used. If too many terms are being found and need to be cross-referenced, applying an alternative strategy might help eliminate noise more quickly.

The subject-predicate-object context is used and therefore the model has concept nodes (subjects) linked to other concept nodes (objects) via relationships (predicates). This results in a rapid divergence of the best terms for a concept or relationship and using a score threshold, a lexicon of the types may be built.

This lexicon forms the basis of the NLP model used to process all unstructured information in the business and semantically classify all mentions of concepts in any corporate documents so they can be used for any of the now standard benefits of text analysis mentioned earlier.

Having identified many of the explicit labels for concept and relationship instances, annotation can be done and standard machine learning techniques applied to derive syntactical rules based on any exposed feature of the text e.g. capitalization, part of speech, numeric, classified tokens found by regular expressions e.g. date/time, URLs, email, etc.

Annotation refers to the process that, having identified some terms (single words or multi word phrases representing the concepts) in the preceding text, the text content may be scanned for these and the occurrences marked up in the text. The resulting marked up text may be used as input to a standard machine learning process which would automatically generate a model which would glean the important contextual features which identify the occurrence of such things. This may then be applied as an NLP model in itself but, in most cases, would be better used as a way to generate more potential terms.

The annotated text then allows either an automatic model to be produced as for the standard machine learning case or to present a domain specialist with a statistical view of the feature distribution around annotated instances so that appropriate syntactical rules and/or important text features may be identified and subsequently applied.

The machine learning may be either fully automatic or user moderated. In the user moderated case, the machine learning may just present the domain specialist with statistical observations such as the predominance of a give feature pattern preceding an instance of a type. For example, patterns like "Mr." and "Dr." precede person references. This provides the derivation of the syntactical rules, either automated to some degree with various machine learning techniques or user moderated hybrid learning using the machine learning to discover statistically relevant feature patterns and present them to a domain specialist user.

The intersection of the derived syntactic rules and the n-gram set derived from a context suspended between any two or more elements of the model (concept or relationship) may be used to expand the skeleton based on the reference documents. This allows for efficient production of an accurate NLP model with high coverage.

The use of verb structures from linguistic classification of verbs can also be used to drive the intersection logic which may be applied to the n-gram set.

Initial seed syntactic rules may be derived (step 102 of FIG. 1) which may be used to seed the process of generating additional syntactic rules. Additional syntactic rules may be generated from the reference documents 113. This is analogous to the thickening of the preferred terms from the model's concept definition. Given a collection of documents with these concept examples annotated, the syntax which indicates such concepts may be inferred.

The intersection of the generated syntactic rules and the n-grams derived from context suspended between any two or more elements of the model (concept or relationship) yields good results and allows for the efficient production of an accurate NLP model with high coverage.

An embodiment includes the above process in a "feedback loop" meaning that it may be applied iteratively with the output of itself (e.g. "IBM" is used in the example above but this time preferred term "customer" is taken as the variable, which would likely result in discovery of "client").

In an alternative embodiment, the process may jump to neighboring concept nodes before relationship nodes because of the relative simplicity of more atomic noun phrases.

In addition, any combination of the subject-predicate-object structure may be used derived from the model relationships.

The generation of syntactic rules may be considered analogous to the production of new terms, the only difference being the fact that more abstract features are considered. I.e. the terms derivation procedure is looking only at the actual words and word sequences in the text whereas the syntactic rules derivation would be looking at the more abstract features in the text like the features referred to in the earlier paragraph where machine learning is mentioned.

In the main part, the syntactic rule derivation happens after the sequence of FIG. 2 including iteration is complete. However, the use of seed syntactical rules to help in scoring does show that the process may branch to generate them and apply a further generated set along with the initial seed set.

Intersection is happening throughout the process, i.e. in the scoring of the terms in the initial runs and subsequently with the learning and validating of the derived rules in the next step.

Figure 3:
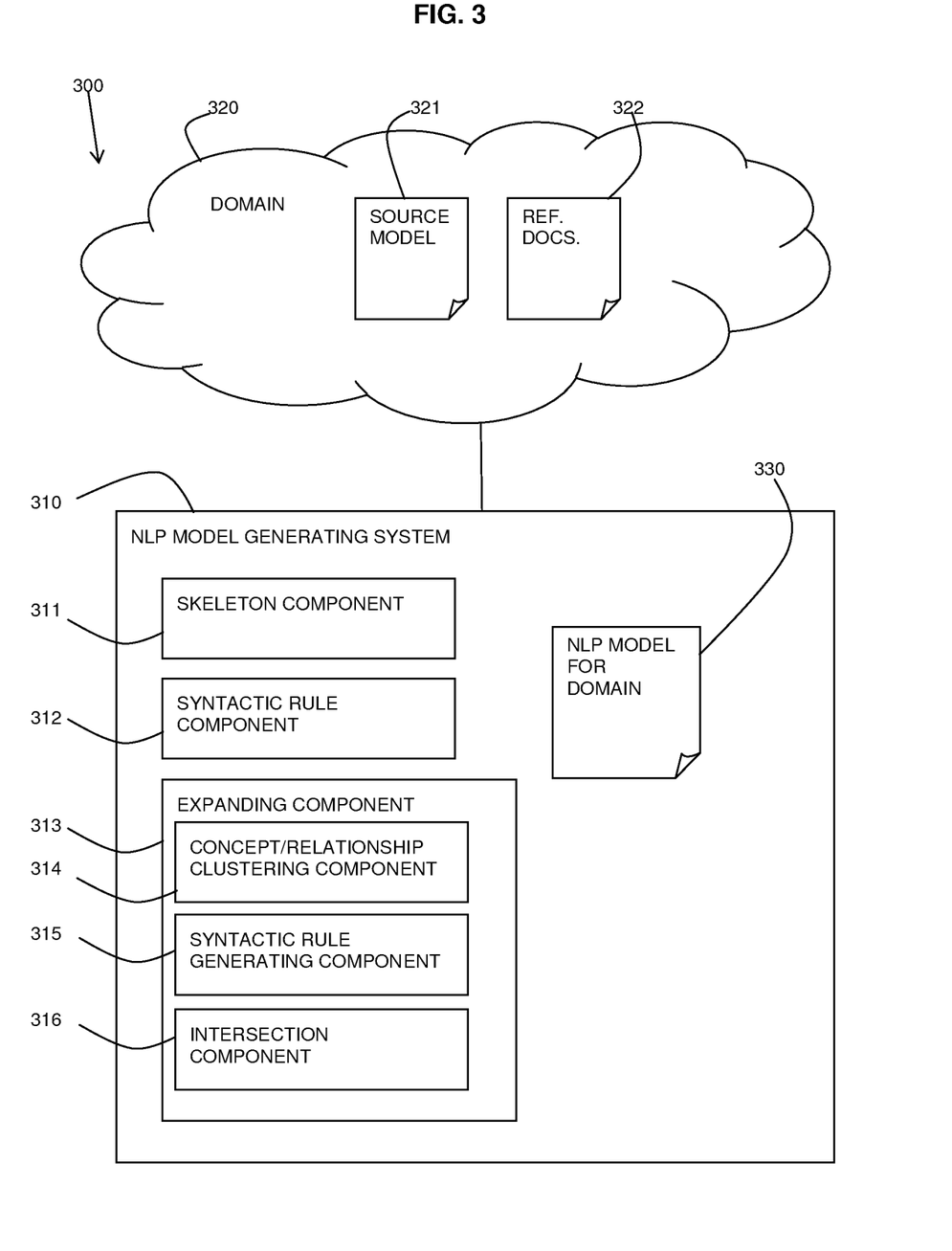
FIG. 3 is a block diagram of an embodiment of a system in accordance with an embodiment of the present invention.

Referring to FIG. 3, a block diagram 300 shows an embodiment of the described system.

An NLP model generating system 310 is provided which may generate and maintain an NLP model for a domain 320. A domain 320 may be, for example, a business domain, medical domain, academic domain, etc. A domain 320 may have a source model 321 such as an industry model or other ontology which uses preferred terms for the domain 320. The domain 320 may also include reference documents 322 such as, for example, emails, policies, guidelines, documents, reports, etc.

The NLP model generating system 310 may include a skeleton component 311 for deriving a skeleton of a natural language lexicon from the domain source model 321. The NLP model generating system 310 may also include a syntactic rule component 312 for combining concept labels and action verbs using a simple set of seed syntactical rules.

The NLP model generating system 310 may also include an expanding component 313 for thickening or expanding the skeleton model from reference documents 322 of the domain 320 with synonym words, verbs and expressions via key word clustering and other techniques. The expanding component 313 may include a concept/relationship clustering component 314 for expanding concept/relationship label terms and a syntactic rule generating component 315 for generating syntactic rules. The expanding component 311 may further include an intersection component 316 for intersecting the clustered concepts/relationships and the generated syntactic rules to produce an NLP model 330

A resulting NLP model 330 may be generated for the domain 320. The NLP model 330 may be used to analyze documents and language used in the domain to provide language analysis. The NLP model 330 may automatically "read" all text in a domain and map it to where it fits in the model providing structure for the text for analysis.

Figure 4:
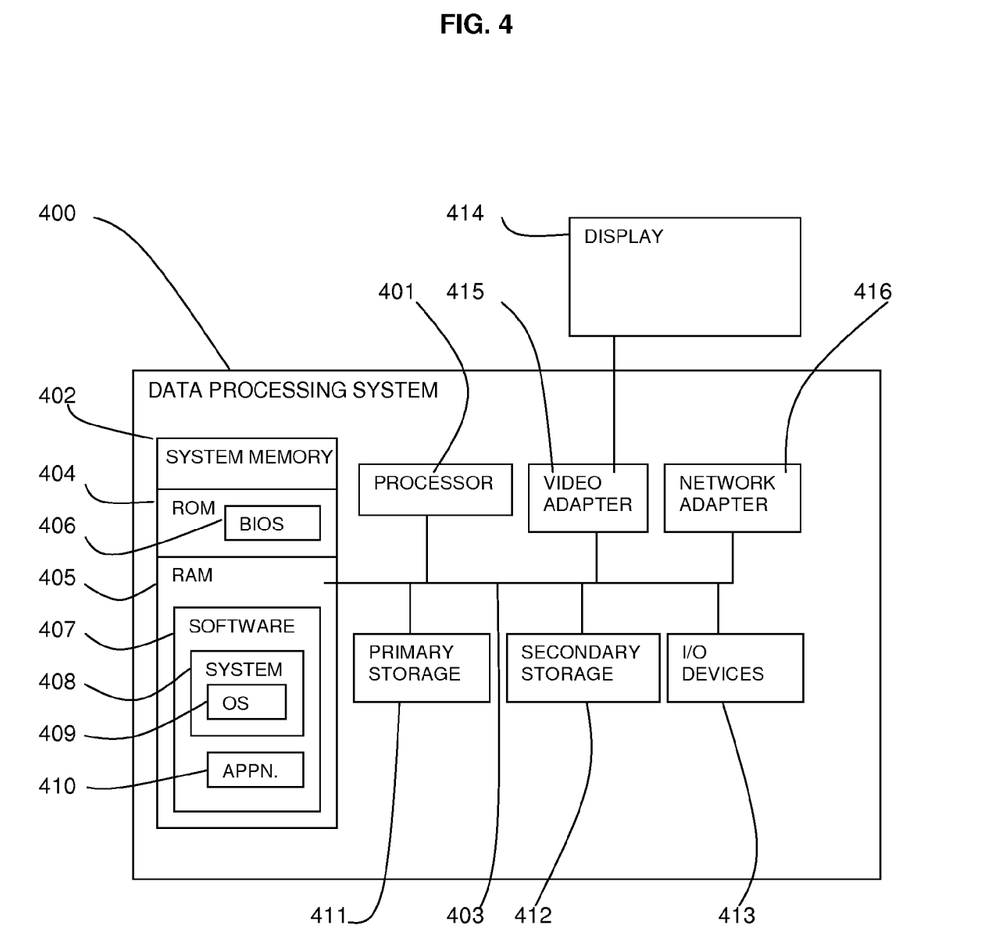
FIG. 4 is a block diagram of a computer system in accordance with an embodiment of the present invention.

Referring to FIG. 4, an exemplary system for implementing an embodiment includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

An example is given using the Financial Services Data Model (FSDM) as the source model. The FSDM is a classification model that comprises an enterprise-wide vocabulary which is used to precisely define the meaning of the many concepts that make up the Financial Institution's view of itself and its business environment. It enables all aspects or points of view pertaining to a particular business concept to be expressed in terms of the elements within a classification hierarchy.

Figure 5:
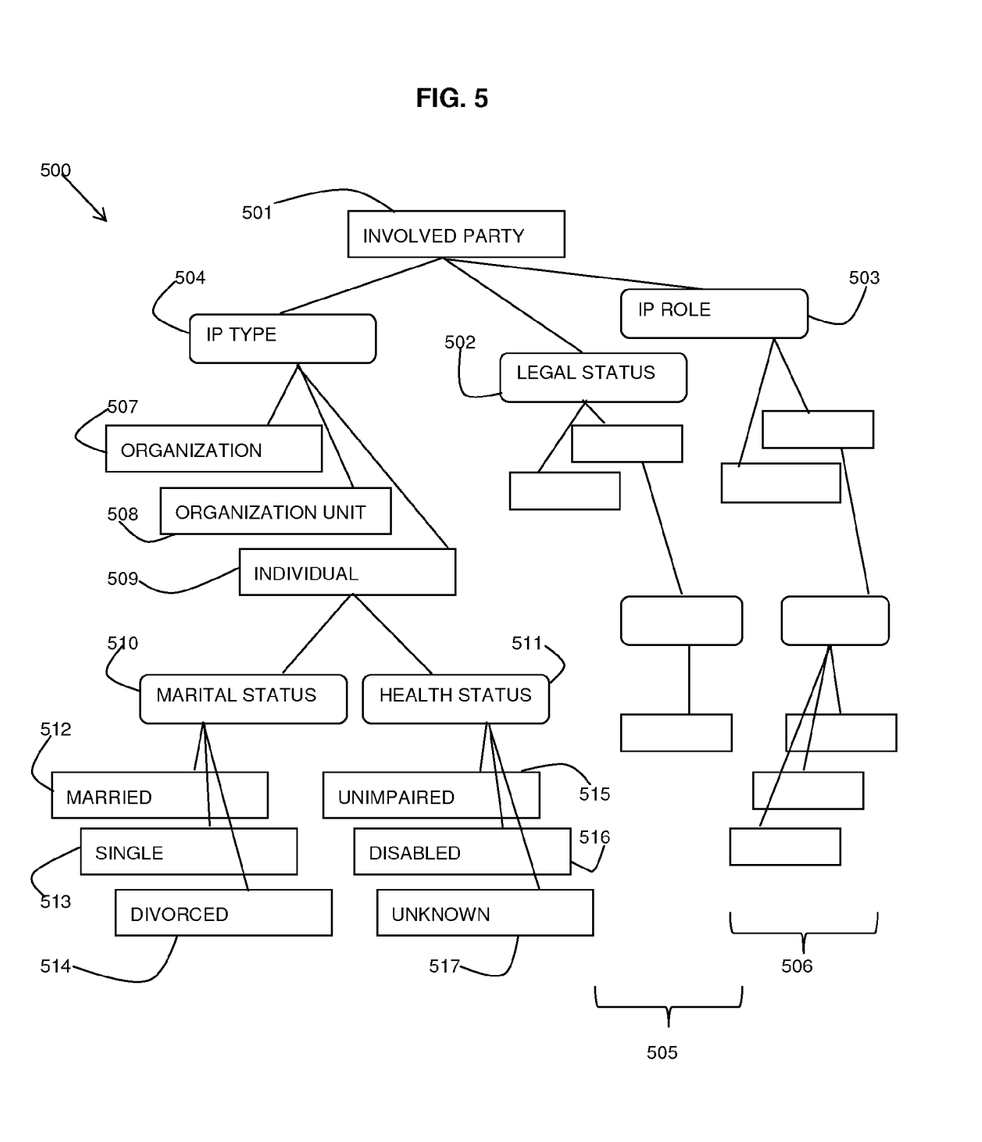
FIG. 5 is a tree diagram of a source model in accordance with an aspect of an embodiment of the present invention.

Referring to FIG. 5, a tree diagram 500 shows the classification hierarchy for the term "Involved Party" 501 in the FSDM. The rectangles represent objects and the rounded blocks represent attributes. The attributes are a special type of relationship called a "has_a", i.e. "Involved Party has_a IP type Individual" which means "A is an individual". Therefore, the attributes are a sort of classification. The information in the tree diagram 500 may be used in parent nodes directly or across sibling nodes in special cases. The whole tree may be used to gather information for the concepts of interest.

The tree diagram 500 has a root node 501 for "Involved Party" with child attribute nodes of "Legal Status" 502, "Role" 503, and "Type" 504. The further child nodes of the "Legal Status" node 502 and "Role" node 503 are shown generally as branches 505, 506.

The "Type" node 504 has child nodes shown for "Organization" 507, "Organization Unit" 508, and "Individual" 509. The "Individual" node 509 has child attribute nodes shown for "Marital Status" 510, and "Health Status" 511. The "Martial Status" node 510 has child nodes of "Married" 512, "Single" 513, and "Divorced" 514. The "Health Status" node 511 has child nodes of "Unimpaired" 515, "Disabled" 516, and "Unknown" 517.

Figure 6:
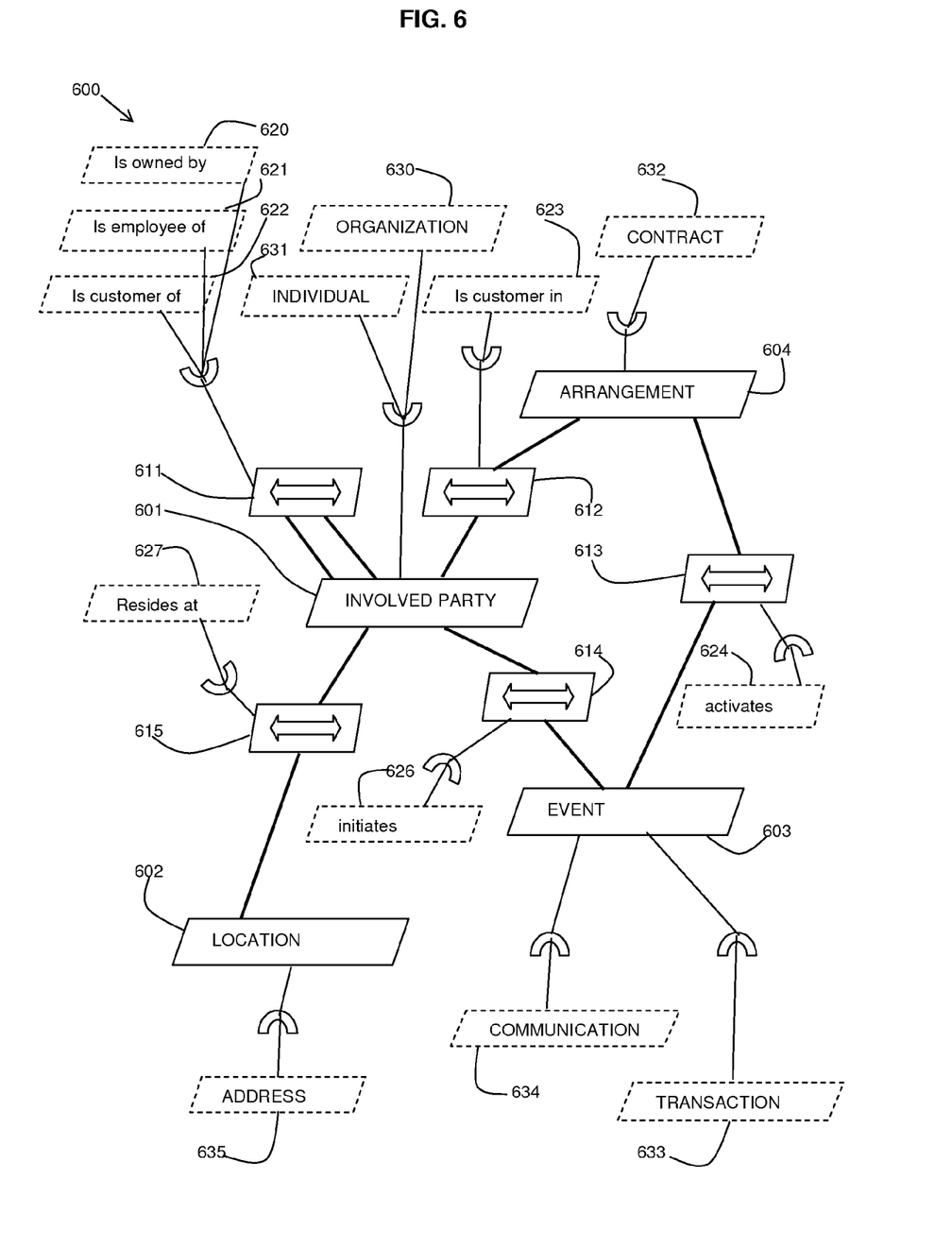
FIG. 6 is a relationship diagram of a source model in accordance with an aspect of an embodiment of the present invention.

These concepts represented as nodes can be related to each other via relationships as shown in FIG. 6. FIG. 6 is a schematic diagram 600 linking concepts by relationships. This gives the ability to explain various business scenarios.

In FIG. 6, an object, for example, Involved Party 601, Location 602, Event 603, and Arrangement 604, may be linked by relationships shown as arrows 611, 612, 613, 614, 615. The arrows and the relationships they represent may be single direction or bidirectional.

Distinct relationships 620-627 (dashed boxes with lower case names) may be members of a relationship 611-615 indicated by a "U" sign.

Distinct concepts 630-635 (dashed boxes with upper case names) may be members of an object 601-604.

For example, starting at the Involved Party 601, the diagram indicates that an Individual 631 or Organization 630 may be an Involved Party 601 and the relationship they can have with an Event 603 such as a Transaction 633 or Communication 634 is "initiates" 626. Put another way, an Involved Party initiated a communication (e.g. John Smith sent an email).

Example use case scenarios are listed below. Potential uses for NLPs and text analysis in general are numerous and far reaching, and the following are a few examples:

Example 1

An insurance provider wants emails to be automatically related to relevant artifacts maintained in data repositories (i.e. customers, policies, claims, etc.). An NLP model can be used to transform free text resources like email as data input by processing the contained text, flagging references to relevant information bits like names, policy numbers, claim IDs, and then mapping those to existing records.

Example 2

A modeler needs to validate that a banking model supports ISO20022/Sepa requirements. SPEA is a new pan-European payments system that is being introduced across the EU between 2007 and 2010. There are specific requirements set down for Financial Institutions or Payment Processors to become SEPA registered and SEPA compliant. An NLP model could process the regulatory documentation, identify the necessary model requirements (concepts, relationship, . . . ) and validate if a given banking model provides the necessary support for those requirements.

Example 3

An IBM consultant wants to estimate more easily the cost of upgrading company X's existing infrastructure to a given healthcare model. Company X hired IBM to revamp their data infrastructure based on the healthcare models provided by "Industry Models". A consultant is tasked to analyze the existing capacity of company X's system and estimate the work involved in the upgrade. An NLP model could be of great help in analyzing structural reports, architectural documentation, etc. from company X to identify missing concepts from the existing architecture. A natural language processing model generating system may be provided as a service to a customer over a network. An embodiment can take the form of an entirely hardware embodiment, an entirely software embodiment or an embodiment containing both hardware and software elements. An embodiment is implemented in software, which includes but is not limited to firmware, resident software, microcode, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. For the purposes of this description, a computer usable or computer readable medium can be any apparatus that can contain, store, communicate, propagate, or transport the program for use by or in connection with the instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating a natural language model for a specific information domain, comprising:
building a skeleton of a natural language lexicon for the specific information domain from a source model of the specific information domain, the skeleton comprising terms found in the source model, the source model comprising classification hierarchies for the terms, the terms including objects and attributes;

using the skeleton of the natural language lexicon to form a dictionary;

applying a set of syntactical rules defining concepts and relationships to the dictionary;

expanding the skeleton of the natural language lexicon based on a plurality of reference documents from the specific information domain, wherein expanding the skeleton comprises: clustering and scoring terms for concepts and relationships, and an intersection component for intersecting the syntactic rules and the clustered concepts and relationships; and using the expanded skeleton of the natural language lexicon, provide a natural language processing model for the specific information domain, the natural language processing model utilized by a user in the specific information domain to analyze documents in the specific information domain.

2. The method as claimed in claim 1, wherein building a skeleton of a natural language lexicon uses preferred terms in the specific information domain.

3. The method as claimed in claim 1, wherein applying a set of syntactical rules includes taking subject, predicate, object and varying order for coverage.

4. The method as claimed in claim 1, wherein expanding the skeleton further comprises:
selecting a preferred term as a concept or relationship;
carrying out a keyword search for the preferred term in reference documents; and
providing an ordered set of potential for the preferred term.

5. The method as claimed in claim 1, further comprising:
determining local n-grams;
measuring one or more metrics of the n-grams; and
scoring the n-grams.

6. The method as claimed in claim 1, further comprising:
deriving further syntactic rules based on the reference documents.

7. The method as claimed in claim 6, further comprising:
using verb structures from linguistic classes of verbs to drive the intersection applied to the clustered terms.

8. The method as claimed in claim 1, wherein expanding the skeleton starts at a starting concept or relationship and moves out through neighboring concepts or relationship links in the source model.

9. The method as claimed in claim 1, wherein expanding the skeleton dynamically changes an iterating strategy based on results comprising:
determining a divergence of best terms for a concept or relationship using a score threshold.

10. The method as claimed in claim 1, wherein building a skeleton of a natural language lexicon is based on more than one source model.

11. The method as claimed in claim 1, wherein building, a skeleton of a natural language lexicon leverages open data to populate the skeleton initially wherein the ontology classes of the source model are matched to classes of open data.

12. A computer program product for a natural language processing model for a specific information domain, the computer program product comprising a non-transitory computer readable storage medium having computer readable program code embodied therewith, said computer readable program code executable by a computer, comprising:
building a skeleton of a natural language lexicon for the specific information domain from a source model of the specific information domain, the skeleton comprising terms found in the source model, the source model comprising classification hierarchies for the terms, the terms including objects and attributes;

using the skeleton of the natural language lexicon to from a dictionary;

applying a set of syntactical rules defining concepts and relationships to the dictionary;

expanding the skeleton of the natural lexicon based on a plurality of reference documents from the specific information domain, wherein expanding the skeleton comprises: clustering and scoring terms for concepts and relationships, and an intersection component for intersecting the syntactic rules and the clustered concepts and relationships; and using the expanded skeleton of the natural language lexicon, provide a natural language processing model for the specific information domain, the natural language processing model utilized by a user in the specific information domain to analyze documents in the specific information domain.

13. A system for generating a natural language processing model for specific information domain, comprising:
a processor configured for building a skeleton of a natural language lexicon for the specific information domain from a source model of the specific information domain and for using the skeleton of the natural language lexicon to form a dictionary, the skeleton comprising terms found in the source model, the source model comprising classification hierarchies for the terms, the terms including objects and attributes;
a syntactic rule component for applying a set of syntactical rules defining concepts and relationships to the dictionary; and
an expanding component, including an intersection component, for expanding the skeleton of the natural language lexicon based on reference documents and using the syntactic rule component to provide a natural language processing model, the natural language processing model utilized by a user in the specific information domain to analyze documents in the specific information domain, wherein expanding the skeleton comprises: clustering and scoring terms for concepts and relationships, and intersecting the syntactic rules and the clustered concepts and relationships.

14. The system as claimed in claim 13, wherein the clustering and scoring terms for concepts and relationships comprises the syntactic rule applying a set of syntactical rules includes taking subject, predicate, object and varying order for coverage.

15. The system as claimed in claim 13, wherein the expanding component for expanding the skeleton includes components includes a concept/relationship clustering component for:
selecting a preferred term as a concept or relationship;
carrying out a keyword search for the preferred term in reference documents from the specific information domain; and
providing an ordered set of potential terms for the preferred term.

16. The system as claimed in claim 13, wherein the concept/relationship clustering component is for:
determining local n-grams;
measuring one or more metrics of the n-grams; and
scoring the n-grams.

17. The system as claimed in claim 13, wherein the expanding component for expanding the skeleton of the natural language lexicon includes:

a syntactic rule generating component for deriving further syntactic rules based on the reference documents from the specific information domain.

18. The system as claimed in claim 13, wherein the expanding component for expanding the skeleton starts at a starting concept or relationship and moves out through neighboring concepts or relationship links in the source model, iterating outwards; and refines the expanded terms of concepts and relationships by augmenting scores.

19. The system as claimed in claim 13, wherein the expanding component for expanding the skeleton dynamically changes an iterating strategy based on results.

* * * * *